R. W. JAMISON.
TRACTION WHEEL.
APPLICATION FILED DEC. 27, 1919.

1,372,142.

Patented Mar. 22, 1921.
2 SHEETS—SHEET 1.

Inventor
R. W. Jamison

By Watson E. Coleman
Attorney

R. W. JAMISON.
TRACTION WHEEL.
APPLICATION FILED DEC. 27, 1919.
1,372,142.
Patented Mar. 22, 1921.
2 SHEETS—SHEET 2.
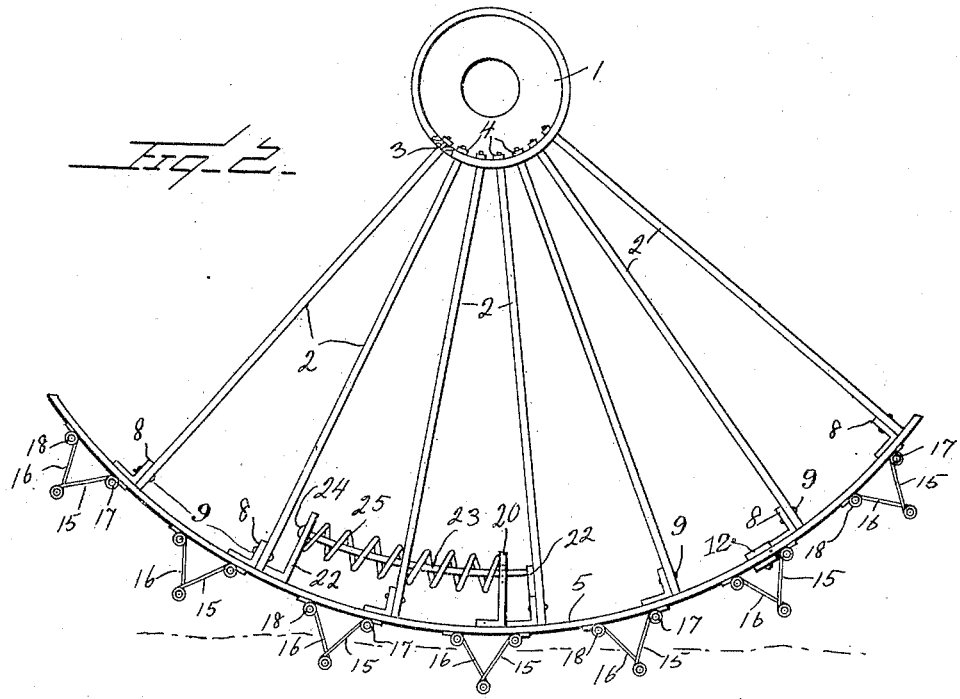
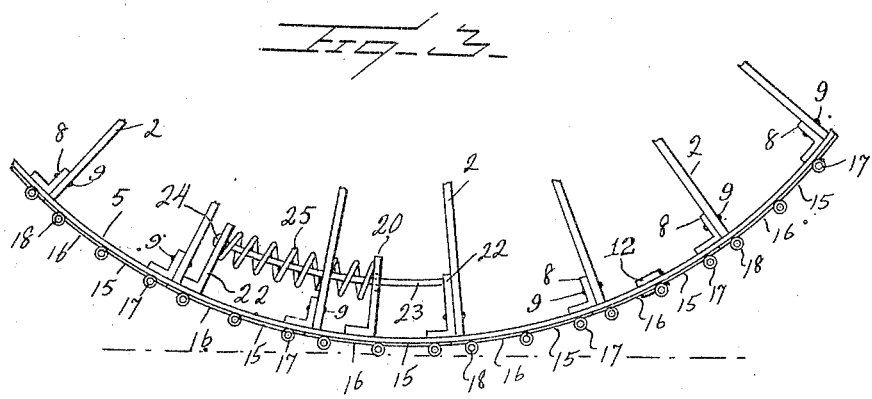
Inventor
R. W. Jamison
By Watson E. Coleman
Attorney

UNITED STATES PATENT OFFICE.

ROBERT W. JAMISON, OF MITCHELL, SOUTH DAKOTA.

TRACTION-WHEEL.

1,372,142. Specification of Letters Patent. Patented Mar. 22, 1921.

Application filed December 27, 1919. Serial No. 347,702.

*To all whom it may concern:*

Be it known that I, ROBERT W. JAMISON, a citizen of the United States, residing at 413 East 9th Ave., Mitchell, in the county of Davison and State of South Dakota, have invented certain new and useful Improvements in Traction-Wheels, of which the following is a specification, reference being had to the accompanying drawings.

This invention relates to an improved traction wheel, particularly adapted for use in connection with heavy farming machines, such as traction engines and the like, and an object of the invention is to provide a wheel of this character including traction members thereon adapted to accommodate themselves to the condition of the road bed, in other words, should the road bed be hard, the traction members will act to flatten out, and still have a tendency to grip the road bed to keep the wheel from slipping, and should the road bed be soft, they will remain rigid and embed into the road bed to insure a greater gripping action thereon.

Another object of the invention is to provide a traction wheel comprising a plurality of fixed rim bands, and a plurality of movable rim bands interposed with relation to the fixed bands, in combination with spring tensioning means between the fixed and movable parts, and members comprising hingedly connected parts, hingedly connecting between the movable and stationary rim bands, whereby should the road bed be hard, the hinged parts (which constitute traction members) will flatten out against the action of the tensioning means, and should the road bed be more or less soft, the hinged parts will embed into the road bed to prevent the wheel from slipping.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in edge elevation of the improved traction wheel constructed in accordance with the invention.

Fig. 2 is a view in side elevation of a portion of a traction wheel, approximately one-half the wheel, showing the traction means thereon and fully extended, so as to engage a soft road bed to insure a greater gripping action.

Fig. 3 is a view similar to Fig. 2, showing the hinged parts of the traction means as having been flattened out, owing to engagements with a hard road bed.

Fig. 4 is an enlarged detail view of several of the rim bands, showing the rigid connections between certain of the bands, and the rigid connections between certain other rim bands, so that one set of rim bands may move annularly with relation to the first set of rim bands.

Referring more especially to the drawings, 1 designates the hub of the wheel which may be constructed, preferably as shown, though not necessarily, and 2 denotes the spokes, which protrude through the wall of the hub, there being collars or shoulders 3 on the spokes to prevent the spokes from passing too far through the wall of the hub. Suitable nuts 4 are threaded upon the inner ends of the spokes 2 so as to rigidly fasten the spokes relatively to the hub. One set of spokes radiate from one end of the hub, while another set of spokes radiate from the oposite end of the hub.

The rim of the wheel comprises a plurality of rim bands, comprising two sets. One set of rim bands comprising the bands 5, 6 and 7 are rigidly united by means of the transversely disposed angle or L-shaped plates 8, which are secured to the inner faces of said bands. The inner and outer sets of spokes have their outer ends bolted or otherwise secured at 9 to the angle plates 8. These angle plates are bolted at 9ᵃ to the rigid rim bands so as to insure a rigid construction between the hub, the spokes and certain rim bands.

The other rim bands 10 and 11 are movable as one body. In fact these bands 10 and 11 are connected by transversely disposed bars 12. The bars 12 are bent or recessed as shown at 13 for the reception of the rigid rim bands, so as to keep the bands relatively spaced.

Traction members are carried by the rim and each traction member comprises the hinged parts 15 and 16. The hinged part 15 of each traction means is hingedly connected at 17 to transversely disposed plates, which are bolted to the rigid rim sections. The hinged part 16 is hingedly connected at 18 to a transversely disposed plate which is bolted at 19 to the annularly movable rim bands. Certain of the transverse bars which are carried by the movable rim bands have inwardly radially extending flanges 20. The fixed rim bands have rigid therewith opposing angle plates 22, in bearings of which the headed rods 23 are mounted, provided with nuts 24. These rods 23 also pass through openings of the flanges 20, and interposed between the flanges 20 and certain of the angle plates 22 and in surrounding relation to the rods 23, are coil springs 25, acting to tension the movable rim bands. These springs 25 are of the type that tend to expand, acting to hold the hinge parts 15 and 16 so that they will assume 45° angles relatively to each other, so that when the wheel passes over the hard surfaced road bed, the hinged parts 15 and 16 of the traction means will flatten out. When the parts 15 and 16 flatten out, it is accomplished against the expansive action of the springs 25. However, even though the hinged parts were flattened out, the hinge rolls of the traction means will still have a gripping action on the road bed, thereby assisting materially in preventing slipping of the wheel. When the wheel contacts with a soft road bed the hinged parts 15 and 16 of the traction means will embed or project into the road bed to insure a greater gripping action, thereby preventing slipping of the wheel. Certain of the bars 12 which are carried by the movable rim bands are designed to contact with the angle plates 8, thereby limiting the movable rim bands in such positions that the hinged parts 15 and 16 will assume 45° angles relatively to each other.

The invention having been set forth, what is claimed as new and useful is:—

1. In a traction wheel of the kind set forth, the combination with a hub, a wheel rim comprising rim bands relatively fixed with relation to the hub and movable rim bands, guiding connections between the movable and relatively rigid rim bands to guide the movable rim bands when moved annularly, traction members comprising hingedly united parts, certain of said parts being fixed to the rigid rim bands, certain other of said parts being fixedly connected to the movable rim bands and yieldable connections between the movable and rigid rim bands.

2. In a traction wheel of the kind set forth, the combination with a hub, of a wheel rim therefor, comprising a plurality of rim bands, certain of said bands being fixedly connected to the hub, certain other of said rim bands being movable annularly with relation to the fixed rim bands and concentric therewith, tensioning means between the movable and fixed rim bands, traction means comprising parts flexibly united connecting the fixed and movable rim bands.

3. In a traction wheel of the kind set forth, having a rim comprising a plurality of movable relatively fixed rim bands, tensioning means connecting between the movable and fixed rim bands, traction means comprising hingedly united plates, certain of said plates being hingedly connected to the fixed rim bands, certain other of said plates being hingedly connected to the movable rim bands, whereby as the rim passes over a hard road bed, the hingedly united plates will flatten out in contact with the rim against the action of the spring tensioning means.

4. The combination with a rim for a traction wheel, comprising relatively fixed rim bands and relatively movable rim bands, of transverse bars having flanges carried by the movable rim bands and having guiding means to guide the movable rim bands with relation to the fixed rim bands, angle plates connecting the fixed rim bands, tensioning springs between the flanges of the transverse bars and the angle plates, traction means comprising hingedly united parts arranged at forty-five degree angles with relation to each other, certain of said parts being fixedly connected to the fixed rim bands, certain other of said parts being fixedly connected to the movable rim bands, whereby as the wheel passes over a hard road bed, the hingedly united parts will flatten out in contact with the rim against the action of the tensioning springs.

In testimony whereof I hereunto affix my signature.

ROBERT W. JAMISON.